United States Patent [19]

Wolfer et al.

[11] Patent Number: 5,006,372
[45] Date of Patent: Apr. 9, 1991

[54] ADHESIVE ORGANOPOLYSILOXANE COMPOSITION WHICH CAN BE CURED TO FORM AN ELASTOMER

[75] Inventors: Dietrich Wolfer, Oberndorf, Austria; Wilhelm Marsch, Haiming, Fed. Rep. of Germany

[73] Assignee: Wacker-Chemie GmbH, Munich, Fed. Rep. of Germany

[21] Appl. No.: 375,073

[22] Filed: Jul. 3, 1989

[30] Foreign Application Priority Data

Jul. 28, 1988 [DE] Fed. Rep. of Germany ....... 3825676

[51] Int. Cl.$^5$ .............................................. B05D 3/02
[52] U.S. Cl. .................................... 427/387; 528/15; 528/24; 528/31; 528/32; 525/478
[58] Field of Search ...................... 528/24, 15, 31, 32; 525/478; 427/387

[56] References Cited

U.S. PATENT DOCUMENTS 4,322,320  3/1982  Caprino et al. ..................... 528/24
4,329,275  5/1982  Hatanaka et al. ................... 528/24

Primary Examiner—Melvyn I. Marquis

[57] ABSTRACT

Organopolysiloxane compositions which can be cured to form elastomers and contain:

(a) An organopolysiloxane containing Si-bonded vinyl groups;
(b) an organopolysiloxane containing Si-bonded hydrogen;
(c) a platinum catalyst which promotes the addition of Si-bonded hydrogen to vinyl groups;
(d) an inhibitor which delays the addition reaction of Si-bonded hydrogen with vinyl groups at room temperature, with the proviso that inhibitors containing a hydroperoxy radical are excluded; and
(e) an organic peroxide, with the proviso that acyl peroxides are excluded;

are used as adhesives.

These adhesives are used to bond similar or dissimilar organopolysiloxane elastomers to each other and to bond organopolysiloxane elastomers to optionally primed substrates.

13 Claims, No Drawings

ADHESIVE ORGANOPOLYSILOXANE COMPOSITION WHICH CAN BE CURED TO FORM AN ELASTOMER

The present invention relates to adhesives and more particularly to adhesive organopolysiloxane compositions which can be cured to form elastomers.

BACKGROUND OF THE INVENTION

Heretofore, the adhesives used to bond silicone rubber parts or profiles to each other were organopolysiloxane compositions which cure in air at room temperature. The curing time of these compositions is several hours, and the adhesives have low mechanical strength.

British Patent No. 2,049,717 (W. J. Bobear, General Electric Company) discloses inhibitor-containing, platinum-catalyzed silicone rubber compositions for hot-air vulcanization which contain:
(a) An organopolysiloxane having Si-bonded vinyl groups;
(b) an organopolysiloxane having Si-bonded hydrogen;
(c) a platinum catalyst;
(d) an inhibitor containing a radical of the formula —C—O—O—H; and
(e) an organic peroxide having the —C—O—O—C group in the molecule.

The organic peroxide (e) is added to the compositions as a curing accelerator, since the hydroperoxy inhibitor (d) is otherwise so effective in these compositions that the compositions only cure on heating to about 540° C. for a longer period than desired for hot-air vulcanization. The addition of the organic peroxide then allows curing of the compositions at 370° C.

The British patent does not disclose the use of inhibitor-containing, platinum-catalyzed silicone rubber compositions as adhesives, nor could their use as adhesives be obvious. The compositions described in the British patent cannot be employed as an adhesive since the compositions described therein only cure at temperatures of 370.C.

Therefore, it is an object of the present invention to provide, as adhesives, an organopolysiloxane composition which can be cured to form elastomers. Another object of the present invention is to provide adhesives for bonding at least two similar or dissimilar readily available organopolysiloxane elastomers to one another. Still another object of the present invention is to provide adhesives for bonding readily available organopolysiloxane elastomer to optionally primed substrates. A further object of the present invention is to provide adhesives having particularly short curing times, high mechanical strength, and adhesion points which are essentially invisible.

SUMMARY OF THE INVENTION

The foregoing objects and others which will become apparent from the following description are accomplished in accordance with this invention, generally speaking, by providing adhesive organopolysiloxane compositions which can be cured to form elastomers in which the adhesive composition contains:
(a) An organopolysiloxane containing Si-bonded vinyl groups;
(b) an organopolysiloxane containing Si-bonded hydrogen;
(c) a platinum catalyst which promotes the addition reaction of Si-bonded hydrogen with vinyl groups;
(d) an inhibitor which delays the addition reaction of Si-bonded hydrogen with vinyl groups at room temperature, with the proviso that inhibitors containing a hydroperoxy radical are excluded; and
(e) an organic peroxide, with the proviso that acyl peroxides are excluded.

DESCRIPTION OF THE INVENTION

The organopolysiloxanes (a) containing Si-bonded vinyl groups which are employed in the compositions of this invention are preferably those of the general formula

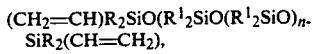

$(CH_2=CH)R_2SiO(R^1{}_2SiO(R^1{}_2SiO)_n\text{-}SiR_2(CH=CH_2))$, in which R represents a methyl, ethyl or phenyl group, $R^1$ represents a methyl, ethyl, vinyl or phenyl group, with the proviso that each vinyl group is present in a vinylmethylsiloxane unit and at least 0.2 mole percent of the diorgano-siloxane units ($R^1{}_2SiO$) are vinylmethylsiloxane units, and n represents a number having a value such that the viscosity of the organopolysiloxanes ranges from 100 to 1,000,000 mPa.s at 25° C. If desired, however, all or some of the vinyl groups in the triorganosiloxy groups may be replaced by R groups.

When low-viscosity organopolysiloxanes (a) containing Si-bonded vinyl groups are employed, organic solvents can be omitted, and a thin, invisible adhesive is obtained.

Due to their availability, at least 90 percent of the organic radicals other than vinyl groups are methyl groups in the organopolysiloxanes (a) containing Si-bonded vinyl groups which are present in the compositions of this invention.

Within and/or along the siloxane chain of the above formula, other siloxane units may be present in addition to the diorganosiloxane units ($R^1{}_2SiO$), which are usually not shown in formulas of this type. Examples of other siloxane units of this type, which are usually only present as contaminants, are those of the general formulas $RSiO_{3/2}$, $R_3SiO_{\frac{1}{2}}$ and $SiO_{4/2}$, where R is the same as above. The amount of other siloxane units of this type, however, should not exceed 5 mole percent.

Organopolysiloxanes (a) containing Si-bonded vinyl groups and their processes for preparation are known in the art.

Any organopolysiloxane which contains at least 3 Si-bonded hydrogen atoms per molecule which heretofore has been or could have been employed in the preparation of compositions which can be cured to form elastomers and contain organopolysiloxanes having vinyl groups, organopolysiloxanes having Si-bonded hydrogen, and catalysts which promote the addition of Si-bonded hydrogen to vinyl groups, can be used as organopolysiloxanes (b) containing Si-bonded hydrogen in this invention. In these organopolysiloxanes, the silicon valencies which are saturated other than by hydrogen or siloxane oxygen atoms are preferably saturated by methyl, ethyl or phenyl radicals or a mixture of at least two such hydrocarbon radicals. It is furthermore preferred that one of the preferred hydrocarbon radicals mentioned above is also bonded to each silicon atom to which a hydrogen atom is bonded.

Particularly preferred organopolysiloxanes (b) containing at least 3 Si-bonded hydrogen atoms per molecule are those of the formula $$R^2(CH_3)_2SiO(SiR^2{}_2O)_pSi(CH_3)_2R^2$$

where $R^2$ represents hydrogen or the methyl, ethyl or phenyl radical, and p is an integer having a value such that the viscosity of the organopolysiloxane ranges from 15 to 1,000 mPa.s at 25° C., with the proviso that only one hydrogen atom is bonded to a silicon atom and that the ratio between the number of $SiR^2{}_2O$ units in which both $R^2$ radicals are hydrocarbon radicals and the number of units containing Si-bonded hydrogen is 1:1 to 20:1. Preferably, $R^2$ also represents a methyl radical if it is not hydrogen.

Such organopolysiloxanes (b) containing Si-bonded hydrogen are generally known and are commercially available.

The organopolysiloxanes (b) containing Si-bonded hydrogen are preferably used in amounts such that 1.2 to 4, and more preferably 1.5 to 2, gram-atoms of Si-bonded hydrogen are present per gram-mole of vinyl groups in the organopolysiloxanes (a) containing Si-bonded vinyl groups.

Any platinum catalyst which promotes the addition of Si-bonded hydrogen to vinyl groups and has heretofore been employed or could have been employed in the preparation of compositions which can be cured to form elastomers which contain organopolysiloxanes having vinyl groups, organopolysiloxanes having Si-bonded hydrogen, and platinum catalysts which promote the addition of Si-bonded hydrogen to vinyl groups can be employed as platinum catalysts (c) in this invention. Examples of such platinum are platinum compounds, such as hexachloroplatinic acid, and the platinum complexes, such as platinum-olefin complexes, for example those with ethylene, propylene, butadiene, cyclopentene or cyclohexene, platinum-alcohol complexes, platinum-ether complexes, platinum-aldehyde complexes, products obtained from the reaction of $H_2PtCl_4 \times 6H_2O$ and monoketones, and also platinum-vinyl siloxane complexes, for example, platinum-1,3-divinyl-1,1,3,3-tetramethyldisiloxane complexes and those complexes which may contain detectable inorganic halogen.

Preferred platinum catalysts (c) used in the compositions employed in the present invention are hexachloroplatinic acid and platinum-1,3-divinyl-1,1,3,3,-tetramethyldisiloxane complexes.

The platinum catalyst (c) is preferably employed in amounts of from 0.5 to 100 ppm by weight, and more preferably from 5 to 20 ppm by weight, calculated as elemental platinum and based on the total weight of the organopolysiloxanes (a) and (b).

Any inhibitor which delays the addition of Si-bonded hydrogen to vinyl groups at room temperature and which has heretofore been employed, or could have been employed for the same purpose, except for inhibitors containing a hydroperoxy radical, can be used in the compositions of this invention as inhibitors (d). Examples of suitable inhibitors (d) are 1,3-divinyl-1,1,3,3-tetramethyldisiloxane, benzotriazole, dialkylformamides, alkylthioureas, methyl ethyl ketoxime and organic or organosilicon compounds having a boiling point of at least 25° C. at 1012 mbar (abs.) and containing at least one aliphatic triple bond, such as ethynylcyclohexanol and 2-methyl-3-butyn-2-ol. Preferred inhibitors (d) are organic or organosilicon compounds having a boiling point of at least 25.C at 1012 mbar (abs.) and containing at least one aliphatic triple bond. A particularly preferred inhibitor (d) is ethynylcyclohexanol. The inhibitor (d) is preferably employed in amounts of from 0.05 to 0.1 percent by weight, based on the total weight of the organopolysiloxanes (a) and (b).

Organic peroxides (e) which can be employed in the compositions of this invention are those peroxides which have been or could have been used to cure organopolysiloxane compositions to form elastomers, except for acyl peroxides which are excluded. Acyl peroxides are those which contain an acyl group, such as in benzoyl peroxide and 2,4-dichlorobenzoyl peroxide. Examples of organic peroxides used in the composition of this invention are alkyl peroxides and aryl peroxides, such as di-tert-butyl peroxide and dicumyl peroxide; perketals, such as 2,5-dimethyl-2,5-di(tert-butylperoxy)hexane and 2,5-dimethyl-2,5-di(t-butylperoxy)hexene; peresters, such as diacetylperoxy dicarbonate, and tert-butyl perbenzoate. Particularly preferred organic peroxides (e) are dicumyl peroxide and 2,5-dimethyl-2,5-di(t-butylperoxy)hexane.

The organic peroxide (e) is preferably used in amounts of from 0.3 to 2 percent by weight, based on the total weight of the organopolysiloxanes (a) and (b).

In addition to components (a) to (e), the compositions of this invention can contain components which are conventionally used or have been used in the preparation of compositions which can be cured to form elastomers based on organopolysiloxanes. These substances may of course be neither poisons for the platinum catalysts which promote the addition of Si-bonded hydrogen to vinyl groups, nor should they affect the strength of the bond. Examples of suitable components which may be employed are, in particular, reinforcing fillers, non-reinforcing fillers, flameproofing agents, pigments, soluble dyes and plasticizers, such as liquid dimethylpolysiloxanes which are end-blocked by trimethylsiloxy groups.

Examples of reinforcing fillers, i.e., fillers having a BET surface area of at least 50 $m^2/g$, are pyrogenically produced silicon dioxide, silica hydrogels which have been dehydrated with retention of structure, and precipitated silicon dioxide having a BET surface area of at least 50 $m^2/g$. Examples of non-reinforcing fillers, i.e., fillers having a BET surface area of less than 50 $m^2/g$, are diatomaceous earth, powdered quartz, calcium silicate, zirconium silicate, zeolites, metal oxide powders, such as the oxides of aluminum, titanium, iron or zinc, barium sulfate, calcium carbonate and gypsum. The fillers mentioned may have been rendered hydrophobic, for example, by treatment with organosilanes or organosiloxanes or with stearic acid or by etherification of hydroxyl groups to form alkoxy groups.

In order to achieve a particularly good bond, reinforcing fillers are preferably used, in amounts of from 20 to 50 percent by weight, based on the weight of the organopolysiloxanes (a) containing vinyl groups.

The viscosity of the organopolysiloxane composition employed in this invention is preferably $10^6$ to $10^7$ mPa.s at 25° C.

The compositions used according to this invention are preferably employed as so-called two-component systems, which means that the organopolysiloxane (b) containing Si-bonded hydrogen is not added to the other components of the compositions of this invention until just prior to use.

The compositions used in this invention are preferably cured at temperatures of at least 100° C. and in particular at 165 to 180° C. so as to achieve the best possible bond within the shortest period of time, namely 20 to 60 seconds, at a coating thickness of from 0.1 to 1 mm.

Surprisingly, it was found that two different cross-linking systems, peroxides and platinum catalyst, could be combined in the compositions of this invention, without having a mutual adverse effect, to provide optimum bonding of all common silicone rubber types. For example, peroxide crosslinked and addition-crosslinked HTV silicone rubber, addition-crosslinked RTV silicone rubber and addition-cross-linked HTV liquid silicone rubber could be bonded to one another without any adverse effects. The same type and different types of organopolysiloxane elastomers can be bonded to one another. Thus, for example, peroxide cross-linked HTV silicone rubber can be bonded to addition-cross-linked HTV silicone rubber. The organopolysiloxane compositions employed in this invention are preferably used to bond at least two organopolysiloxane elastomers of the same or different types. The organopolysiloxane compositions employed in this invention are suitable, not only for bonding compression moldings or extrudates made from different types of silicone rubber to themselves, but also to different inorganic and organic substrates. Thus, any common organopolysiloxane elastomer can be bonded to various, optionally primed substrates, such as, for example, metal, epoxy resin, polyester resin and glass fibers, in which the primer is the customary primer for silicone rubbers. The curing time of the adhesive of this invention is only a few seconds, and the adhesive has good mechanical strength.

In the following examples, all parts and percentages are by weight, unless otherwise specified.

The mixture containing platinum-vinylsiloxane complex and diluent used in the following examples was prepared as follows:

About 20 parts of sodium bicarbonate were added to a mixture containing 10 parts of $H_2PtCl_6 \times 6H_2O$, 20 parts of 1,3-divinyl-1,1,3,3-tetramethyldisiloxane and 50 parts of ethanol. The mixture was refluxed for 30 minutes with stirring, then left to stand for 15 hours and then filtered. The volatile components were removed from the filtrate by distillation at about 16 hPa (abs.). About 17 parts of a liquid residue was obtained, which was dissolved in benzene. The solution was filtered and the benzene was removed from the filtrate by distillation. The residue was mixed with a dimethylpolysiloxane containing dimethylvinylsiloxane units as terminal units and having a viscosity of 1400 mPa.s at 25° C. as diluent in an amount such that the mixture contains 1 percent by weight of platinum, calculated as the element.

The peroxide crosslinked HTV rubber used in the following examples was prepared in the following manner:

About 100 parts of a diorganopolysiloxane endblocked by trimethylsiloxy groups and comprising 99.93 mole percent of dimethylsiloxane units and 0.07 mole percent of vinylmethylsiloxane units and having a viscosity of $8 \times 10^6$ mPa.s at 25° C. are mixed in a kneader operated at 150° C. first with 50 parts of silicon dioxide produced pyrogenically in the gas phase and having a BET surface area of 200 m²/g, then with 7 parts of a dimethylpolysiloxane containing one Si-bonded hydroxyl group in each of the terminal units and having a viscosity of 40 mPa.s at 25° C. After the mixture has cooled to a temperature of less than 60° C., then 0.7 part of dicumyl peroxide is added. The resultant mixture is subsequently pressed for 10 minutes at a temperature of 170° C. in a multi-daylight press to form sample sheets of 2 mm thickness for the bonding experiments.

Preparation of the addition-crosslinked HTV silicone rubber used in the following examples:

About 75 parts of a diorganopolysiloxane endblocked by trimethylsiloxy groups and comprising 99.7 mole percent of dimethylsiloxane units and 0.3 mole percent of vinylmethylsiloxane units and having a viscosity of $8 \times 10^6$ mPa.s at 25° C., and 25 parts of a diorganopolysiloxane end-blocked by trimethylsiloxy groups and comprising 99.4 mole percent of dimethylsiloxane units and 0.6 mole percent of vinylmethylsiloxane units and having a viscosity of $8 \times 10^6$ mPa.s at 25° C. are mixed and kneaded for two hours in a kneader operated at 150° C. together with 45 parts of silicon dioxide produced pyrogenically in the gas phase and having a BET surface area of 300 m²/g, and 7 parts of a dimethylpolysiloxane having one Si-bonded hydroxyl group in each of the terminal units and a viscosity of 40 mPa.s at 25° C. After the mixture has cooled to room temperature, 5 ppm by weight of platinum in the form of a 1 percent solution of hexachloroplatinic acid in isopropanol, and 0.2 ppm by weight of benzotriazole are admixed, the ppm in each case is based on the total weight of the above described mixture cooled to room temperature. About 1 part of a methyl hydrogen polysiloxane endblocked by trimethylsiloxy groups and having a viscosity of 20 mPa.s at 25° C. is then added to the mixture. Sheets 2 mm in thickness are produced from this composition and used as sample sheets for the bonding experiments in the following examples. The composition is vulcanized by heating for 10 minutes at 150° C.

EXAMPLE 1

About 100 parts of a dimethylpolysiloxane endblocked by vinyldimethylsiloxy groups and containing 620 dimethylsiloxane units and having a viscosity of 20,000 mPa.s at 25° C. are mixed at room temperature in a kneader first with 6 parts of hexamethyldisilazane and 3 parts of water. About 35 parts of silicon dioxide which has been produced pyrogenically in the gas phase and has a BET surface area of 200 m²/g are added to the mixture, and after the mixture has been homogenized, the mixture is kneaded for two hours at 150° C. in the presence of nitrogen.

After the mixture has been cooled to 50° C., 2.5 parts of dicumyl peroxide are mixed with 100 parts of this mixture. After cooling to room temperature, the mixture is homogenized in a triple roll mill. About 0.2 part of the platinum-vinylsiloxane complex/diluent mixture containing 1 percent by weight of platinum, calculated as the element, and 0.07 part of ethynylcyclohexanol are then mixed with the mixture in a stirred vessel.

The composition is prepared for application by adding to the above mixture, 1 part of a diorganopolysiloxane comprising dimethylsiloxane units and methylhydrogensiloxane units and containing dimethylhydrogensiloxane units as terminal units, in which 2 methylhydrogensiloxane units are present per dimethylsiloxane unit, and having a viscosity of 75 mPa.s at 25° C.

EXAMPLE 2

Five standard S 3A specimens are stamped out of the 2 mm thick sheet of the peroxide crosslinked HTV silicone rubber whose preparation is described above and has a tear strength of 8.5 N/mm², determined in accordance with DIN 53 505 using a S 3A standard specimen. The test specimens are cut in the center, and the two cut surfaces are thinly coated with the ready-to-use composition prepared in Example 1, placed together again using slight pressure and heated for 30 seconds at 170° C. The values for the tear strength, determined according to DIN 53 505, are given in Table 1.

TABLE 1

| Sample | Tear Strength N/mm$^2$ |
| --- | --- |
| 1 | 8.0 |
| 2 | 7.8 |
| 3 | 8.1 |
| 4 | 8.3 |
| 5 | 7.8 |

In all five samples, the break point was at the point of adhesion.

EXAMPLE 3

Five S 3A standard specimens were stamped both from the 2 mm thick sheet of the peroxide crosslinked HTV silicone rubber whose preparation is described above and has a tear strength of 9.0 N/mm$^2$, determined in accordance with DIN 53 505 on a S 3A standard specimen. The test specimens were each cut in the center, and half of each of the test specimens comprising the peroxide crosslinked HTV silicone rubber is bonded to half of each of the standard specimen of the addition-crosslinked HTV silicone rubber. The two cut surfaces are thinly coated as in Example 2 with the ready-to-use composition whose preparation is described in Example 1, and the two halves are placed against each other using gentle pressure and heated for 30 seconds at 170° C. The values for the tear strength, determined in accordance with DIN 53 505, are given in Table 2.

TABLE 2

| Sample | Tear Strength N/mm$^2$ |
| --- | --- |
| 1 | 7.7 |
| 2 | 8.3 |
| 3 | 8.1 |
| 4 | 7.9 |
| 5 | 8.3 |

The fracture occurred within the peroxide crosslinked HTV silicone rubber in the case of samples 2 and 5 and at the point of adhesion in the case of samples 1, 3 and 4.

COMPARISON EXAMPLE (a) Preparation of a commercially available adhesive composition based on organopolysiloxanes which cure in air at room temperature:

About 75 parts of a dimethylpolysiloxane containing one Si-bonded hydroxyl group in each of the terminal units and having a viscosity of 50,000 mPa.s at 25° C. are homogenized in a kneader operated at room temperature with 5 parts of hexamethyldisilazane and 2.5 parts of water and with 20 parts of silicon dioxide which has been produced pyrogenically in the gas phase and has a BET surface area of 150 m$^2$/g. The mixture is subsequently warmed to 120° C. and kneaded at this temperature for five hours. The excess hexamethyldisilazane and water are then removed by distillation at 120° C. and at about 100 mbar. About 94.98 parts of the resultant mixture are mixed homogeneously with 5 parts of methyltriacetoxysilane and 0.05 part of diacetoxybutyltin acetate. The resultant composition, which is freed from gas inclusions by evacuation, has a long shelf life when water is excluded and crosslinks at room temperature in the presence of moisture to form an elastomer.

(b) The procedure of Example 2 is repeated, except that the adhesive whose preparation is described in Example 1 is replaced by the adhesive whose preparation is described in (a) above, and the adhesive is cured at room temperature instead of at 170° C. The curing time is 24 hours. The tear strength is determined for the five samples as described in Example 2. The results are given in Table 3.

TABLE 3

| Sample | Tear Strength N/mm$^2$ |
| --- | --- |
| 1 | 4.2 |
| 2 | 4.1 |
| 3 | 3.7 |
| 4 | 3.7 |
| 5 | 4.1 |

The fracture occurred at the point of adhesion in all five samples.

What is claimed is:

1. An adhesive composition for organopolysiloxane elastomers, which comprises:
   (a) An organopolysiloxane containing Si-bonded vinyl groups;
   (b) an organopolysiloxane containing Si-bonded hydrogen;
   (c) a platinum catalyst which promotes the addition of Si-bonded hydrogen to vinyl groups;
   (d) an inhibitor which delays the addition reaction of Si-bonded hydrogen with vinyl groups at room temperature, with the proviso that an inhibitor containing a hydroperoxy radical is excluded, and
   (e) an organic peroxide, with the proviso that an acyl peroxide is excluded.
2. The adhesive of claim 1, wherein the inhibitor (d) is ethynylcyclohexanol.
3. The adhesive of claim 1, wherein the organic peroxide (e) is selected from the group consisting of dicumyl peroxide and 2,5-dimethyl-2,5-di(tert-butylperoxy)-hexane.
4. The adhesive of claim 2, wherein the organic peroxide (e) is selected from the group consisting of dicumyl peroxide and 2,5-dimethyl-2,5-di(tert-butylperoxy)-hexane.
5. The adhesive of claim 1, which bonds at least two similar or dissimilar organopolysiloxane elastomers to each other.
6. The adhesive of claim 2, which bonds at least two similar or dissimilar organopolysiloxane elastomers to each other.
7. The adhesive of claim 3, which bonds at least two similar or dissimilar organopolysiloxane elastomers to each other.
8. A method for bonding an organopolysiloxane elastomer to an unprimed substrate which comprises applying the adhesive of claim 1 to an organopolysiloxane elastomer and/or an unprimed substrate and thereafter applying the organopolysiloxane elastomer to the unprimed substrate.
9. A method for bonding an organopolysiloxane elastomer to a primed substrate which comprises applying the adhesive of claim 1 to an organopolysiloxane elastomer and/or a primed substrate and thereafter applying the organopolysiloxane elastomer to the primed substrate.

10. A method for bonding an organopolysiloxane elastomer to an unprimed substrate which comprises applying the adhesive of claim 2 to an organopolysiloxane elastomer and/or an unprimed substrate and thereafter applying the organopolysiloxane elastomer to the unprimed substrate.

11. A method for bonding an organopolysiloxane elastomer to a primed substrate which comprises applying the adhesive of claim 2 to an organopolysiloxane elastomer and/or a primed substrate and thereafter applying the organopolysiloxane elastomer to the primed substrate.

12. A method for bonding an organopolysiloxane elastomer to an unprimed substrate which comprises applying the adhesive of claim 3 to an organopolysiloxane elastomer and/or an unprimed substrate and thereafter applying the organopolysiloxane elastomer to the unprimed substrate.

13. A method for bonding an organopolysiloxane elastomer to a primed substrate which comprises applying the adhesive of claim 3 to an organopolysiloxane elastomer and/or a primed substrate and thereafter applying the organopolysiloxane elastomer to the primed substrate.

* * * * *